D. O. BARRETT.
ADJUSTABLE BUSHING.
APPLICATION FILED JAN. 4, 1918.

1,292,678.

Patented Jan. 28, 1919.

WITNESSES
Edw. Thorpe
A. L. Kitchin

INVENTOR
Dwight O. Barrett
BY
ATTORNEYS

UNITED STATES PATENT OFFICE.

DWIGHT O. BARRETT, OF LIMA, OHIO.

ADJUSTABLE BUSHING.

1,292,678.     Specification of Letters Patent.     Patented Jan. 28, 1919.

Application filed January 4, 1918. Serial No. 210,325.

*To all whom it may concern:*

Be it known that I, DWIGHT O. BARRETT, a citizen of the United States, and a resident of Lima, in the county of Allen and State of Ohio, have invented a new and Improved Adjustable Bushing, of which the following is a full, clear, and exact description.

This invention relates to bushings for shafts and the like and has for an object the provision of an improved construction whereby the shaft may be adjusted by the proper adjustment of the bushing.

Another object of the invention is to provide a solid bushing arranged with a shaft receiving opening offset in such a manner that by turning the bushing to a different position a different alinement of the shaft carried thereby may be secured.

Referring to the accompanying drawing by numerals, 1 indicates a journal box of any kind for supporting a shaft 2. The journal box is provided with a slot or cut whereby a square socket is produced. A bushing 3, squared on the outside, is arranged in the socket of the bearing box 1 and is made of such a size as to snugly fit the box. It is, of course, understood that the outside surface of the bushing 3 could be made hexagonal or other shape, provided the same was shaped to fit the bushing socket in the bearing box 1 in such a manner as to be held against rotation. An aperture 4 is provided in the bushing 3 to receive shaft 2. The aperture 4 is offset in a particular manner in order to secure certain adjustments for the shaft 2, whereby the alinement of said shaft is changed.

Figure 1:
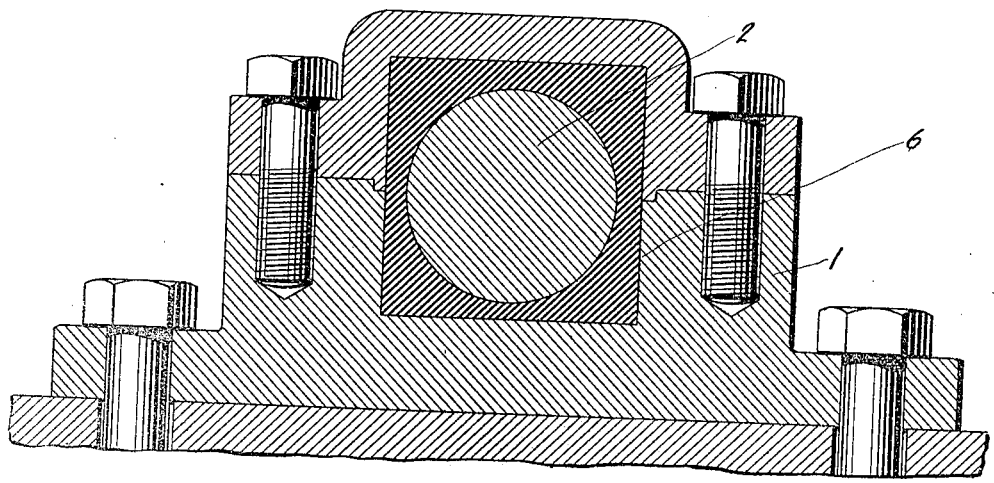
Figure 1 is a sectional view through a journal box, with a bushing shown in connection therewith.
Figure 2:
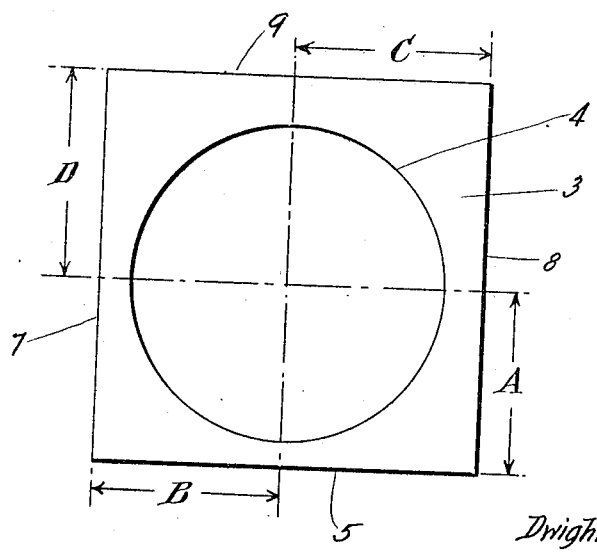
Fig. 2 is an end view of the bushing shown in Fig. 1, the same being on an enlarged scale.

The construction shown in Fig. 2 is such as to produce four adjustments of shaft 2. From the examination of Fig. 2 it will be observed that the distance "A" is less than distance "B", while the distance "B" is less than distance "C". It will also be observed that the distances "A" and "D" equal the outside dimension of one side of the bushing 3 while distances "C" and "B" together equal the outside dimension of the bushing.

By this construction and arrangement the bushing is adjustable though made from one piece, and the center of the circle 4 may be varied so as to vary the distance between two parallel shafts. An example of the need of this would be where two gears ran together and as the bearings became worn the gears would naturally separate. With this construction the shafts carrying gears might be readily adjusted so that the gears would be brought back to their proper position. When the side 5 of the bushing 3 is engaging the bottom of the socket 6 in the box 1 shaft 2 is held in a given position. If the side 7 was turned so as to rest against the bottom of the socket shaft 2 would be moved over slightly, while an additional movement would be produced if side 8 was placed in the lowermost position. When the side 9 is placed in the lowermost position a register movement is produced vertically. If the greatest movement to one side is desired the side 9 is placed in a vertical position on either side of shaft 2 according to the direction in which it is desired to move the shaft.

What I claim is:

1. A bushing formed with an outside surface having squared portions, and a shaft receiving bore offset in respect to said squared portions for producing a shifting of the center of the bore when turning the bushing from one squared portion to another.

2. A bushing for shafts comprising a solid block having squared sides, and a bore for the shaft, said bore being positioned so that the center thereof will be a different distance from each side.

3. The combination with a bearing box having a squared opening, of a bushing having squared sides proportioned to fit said squared opening with any side uppermost, and a bore for receiving a rotatable shaft positioned so that the center thereof will be a different distance from each side.

DWIGHT O. BARRETT.

Copies of this patent may be obtained for five cents each, by addressing the "Commissioner of Patents, Washington, D. C."